(12) United States Patent
Singh et al.

(10) Patent No.: US 11,252,091 B1
(45) Date of Patent: Feb. 15, 2022

(54) UPDATING A TRAFFIC RATE LIMIT FOR POLICING TRAFFIC

(71) Applicant: Juniper Networks, Inc., Sunnyvale, CA (US)

(72) Inventors: Prashant Singh, Santa Clara, CA (US); Sreekanth Rupavatharam, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 153 days.

(21) Appl. No.: 16/678,989

(22) Filed: Nov. 8, 2019

(51) Int. Cl.
| | |
|---|---|
| *H04L 1/00* | (2006.01) |
| *H04L 12/813* | (2013.01) |
| *H04L 12/26* | (2006.01) |
| *G06N 20/00* | (2019.01) |
| *H04L 12/24* | (2006.01) |
| *H04L 29/08* | (2006.01) |

(52) U.S. Cl.
CPC .............. *H04L 47/20* (2013.01); *G06N 20/00* (2019.01); *H04L 41/16* (2013.01); *H04L 43/0894* (2013.01); *H04L 67/145* (2013.01)

(58) Field of Classification Search
CPC ... H04L 5/0053; H04L 12/5602; H04L 41/16; H04L 43/0894; H04L 47/10; H04L 47/15; H04L 47/20; H04L 47/21; H04L 47/215; H04L 47/22; H04L 47/2441; H04L 47/30; H04L 47/32; H04L 47/35; H04L 47/50; H04L 47/70; H04L 67/145; H04L 2012/5631; H04L 2012/568

See application file for complete search history.

(56) References Cited

U.S. PATENT DOCUMENTS

| | | | | | |
|---|---|---|---|---|---|
| 7,310,309 | B1* | 12/2007 | Xu | .......................... | H04L 47/10 370/229 |
| 7,499,395 | B2* | 3/2009 | Rahman | .................. | H04L 43/50 370/229 |
| 7,787,472 | B2* | 8/2010 | Washburn | ........... | H04L 47/2441 370/395.42 |
| 7,830,873 | B1* | 11/2010 | Arad | .................... | H04L 47/6235 370/389 |
| 8,537,671 | B2* | 9/2013 | Alleyne | ................ | H04L 47/215 370/230 |
| 9,485,118 | B1* | 11/2016 | Atlas | ........................ | H04L 47/12 |
| 10,193,807 | B1* | 1/2019 | Atlas | ....................... | H04L 47/25 |

* cited by examiner

*Primary Examiner* — Frank Duong
(74) *Attorney, Agent, or Firm* — Harrity & Harrity, LLP

(57) ABSTRACT

A network device may obtain policer configuration information. The network device may determine, based on the policer configuration information, a traffic rate limit associated with a traffic protocol type. The network device may obtain, based on the traffic protocol type, networking data associated with the traffic protocol type. The network device may determine, based on the networking data, an expected traffic rate associated with the traffic protocol type. The network device may update, based on the expected traffic rate, the traffic rate limit. The network device may cause traffic associated with the traffic protocol type to be policed based on the updated traffic rate limit.

20 Claims, 10 Drawing Sheets

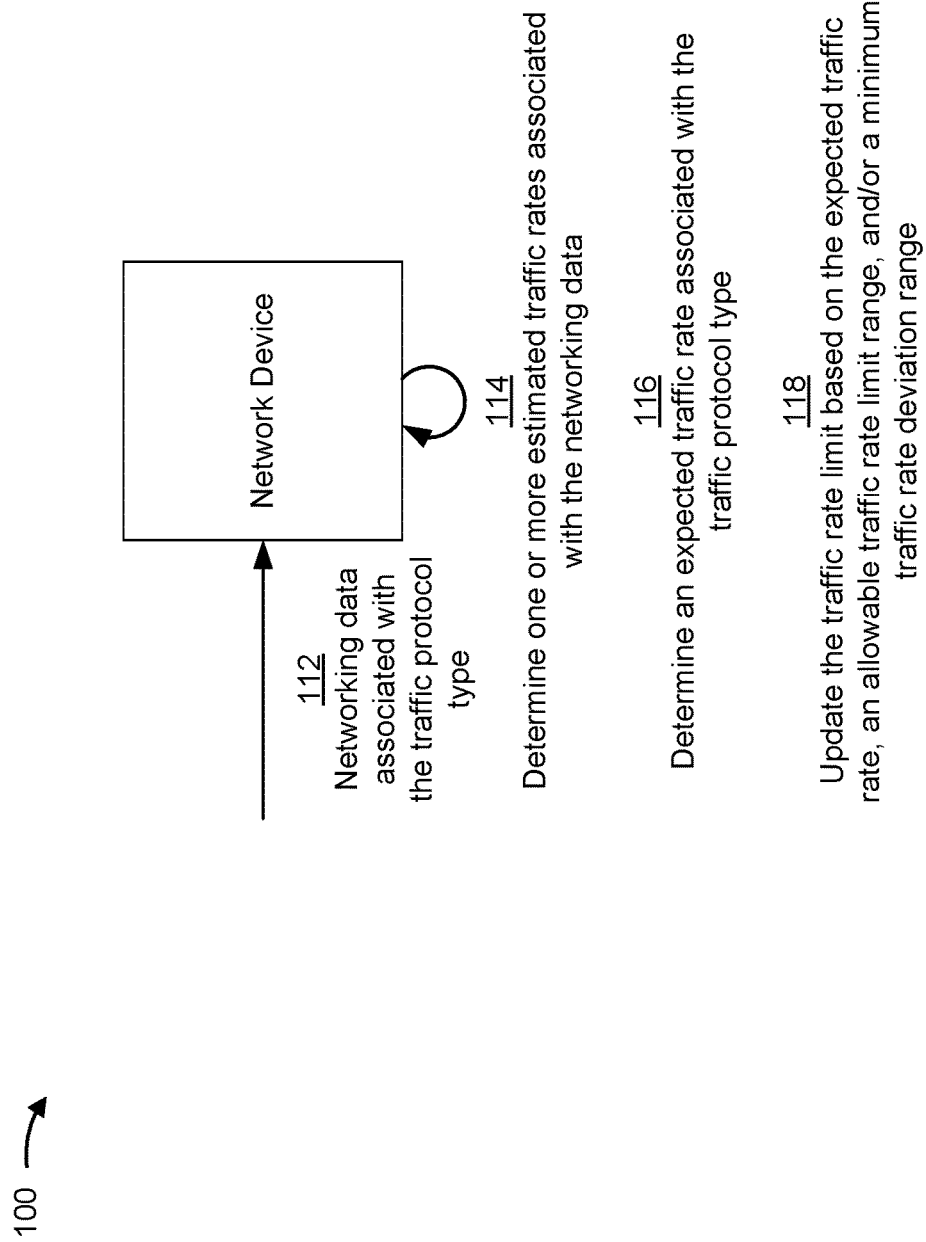

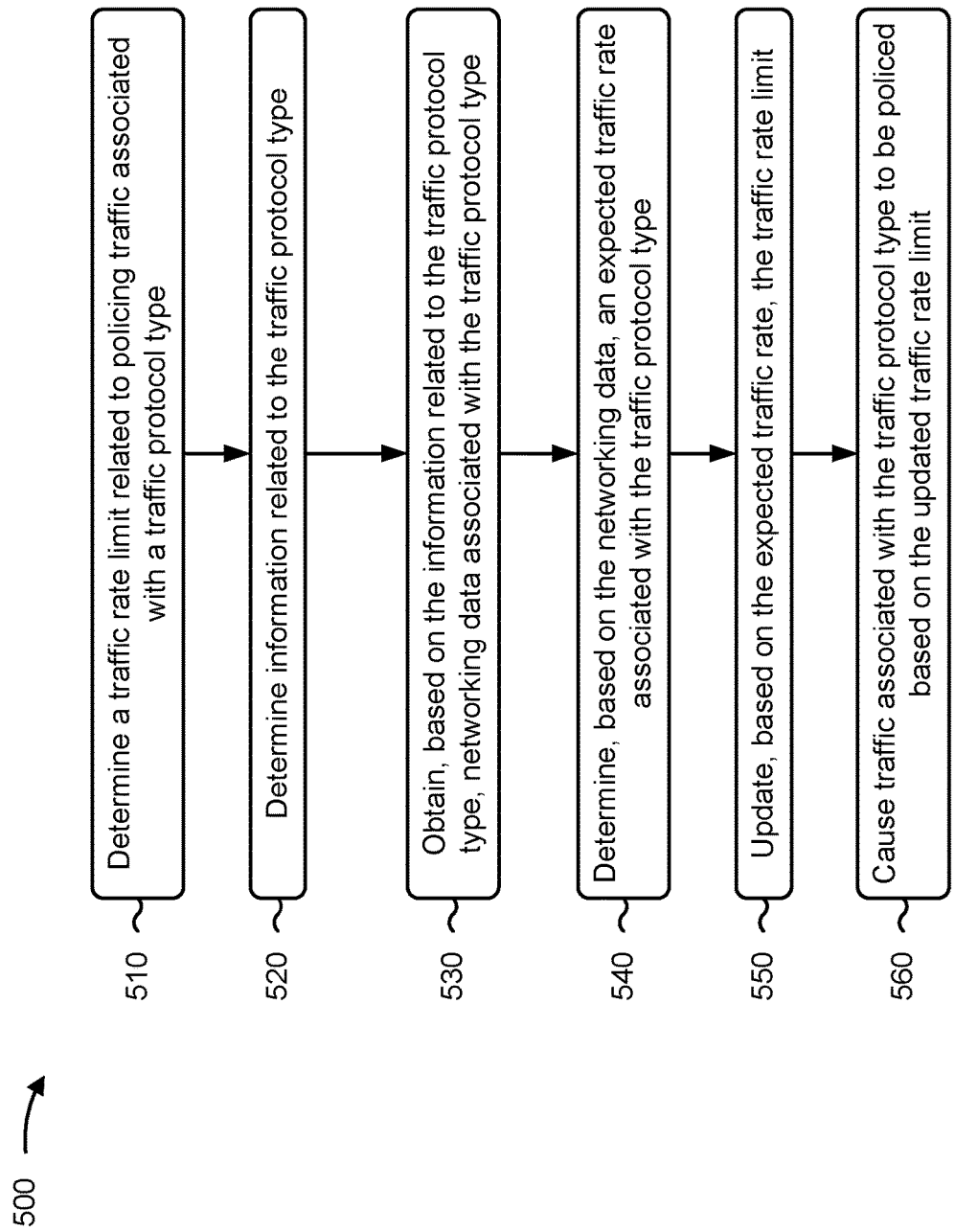

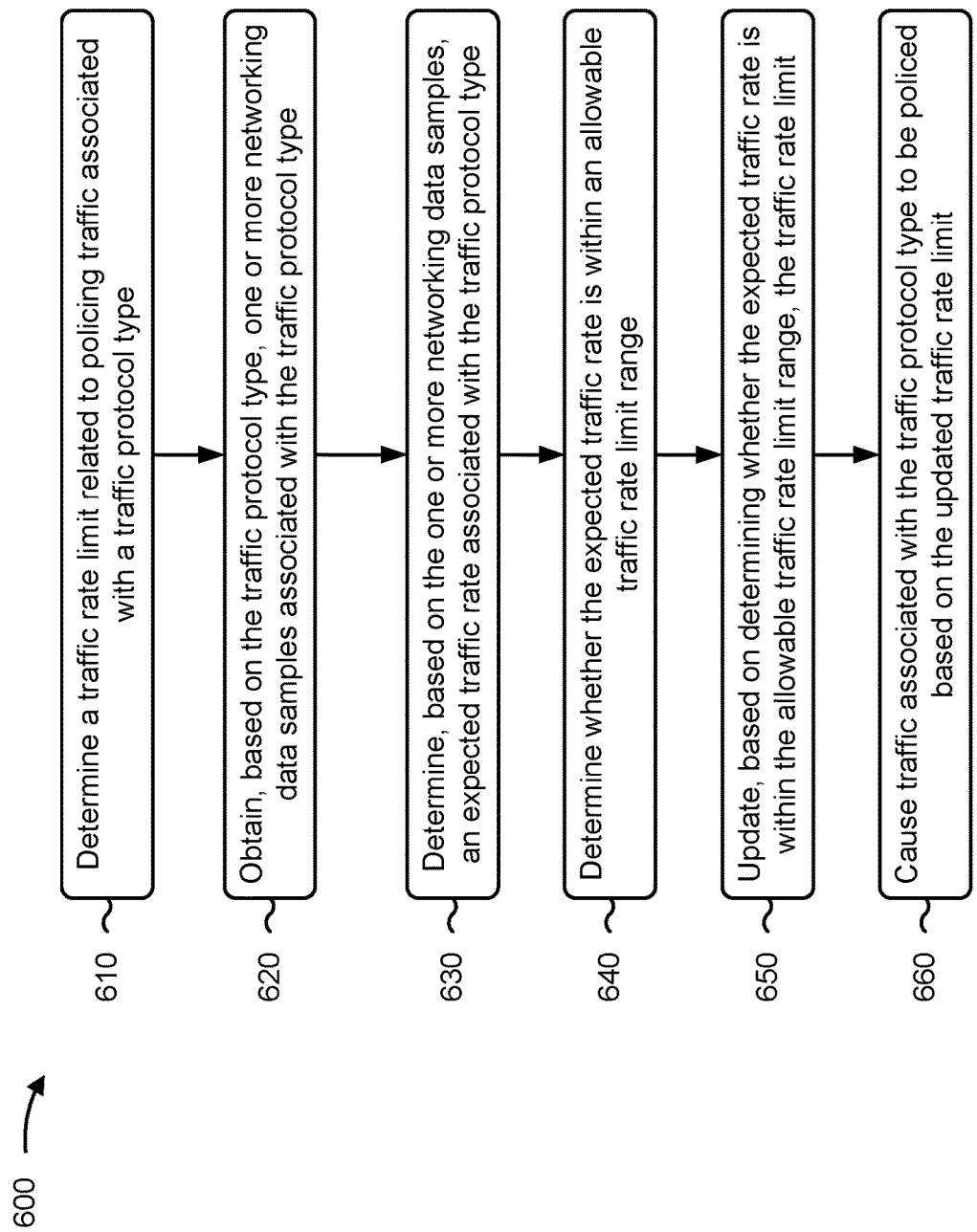

US 11,252,091 B1

UPDATING A TRAFFIC RATE LIMIT FOR POLICING TRAFFIC

BACKGROUND

A network device may implement a policer to restrict an amount of traffic received, routed, and/or forwarded through the network device. The policer may restrict receiving, routing, and/or forwarding of traffic based on a traffic rate limit, a traffic burst size, and/or the like.

SUMMARY

According to some implementations, a method may include obtaining, by a network device, policer configuration information; determining, by the network device and based on the policer configuration information, a traffic rate limit associated with a traffic protocol type; obtaining, by the network device and based on the traffic protocol type, networking data associated with the traffic protocol type (e.g., where the association between the network data and the traffic protocol type is programmable); determining, by the network device and based on the networking data, an expected traffic rate associated with the traffic protocol type; updating, by the network device and based on the expected traffic rate, the traffic rate limit; and causing, by the network device, traffic associated with the traffic protocol type to be policed based on the updated traffic rate limit.

According to some implementations, a network device may include one or more memories, and one or more processors to: determine a traffic rate limit related to policing traffic associated with a traffic protocol type; determine information related to the traffic protocol type; obtain, based on the information related to the traffic protocol type, networking data associated with the traffic protocol type; determine, based on the networking data, an expected traffic rate associated with the traffic protocol type; update, based on the expected traffic rate, the traffic rate limit; and cause traffic associated with the traffic protocol type to be policed based on the updated traffic rate limit.

According to some implementations, a non-transitory computer-readable medium may store one or more instructions. The one or more instructions, when executed by one or more processors of a network device, may cause the one or more processors to: determine a traffic rate limit related to policing traffic associated with a traffic protocol type; obtain, based on the traffic protocol type, one or more networking data samples associated with the traffic protocol type; determine, based on the one or more networking data samples, an expected traffic rate associated with the traffic protocol type; determine whether the expected traffic rate is within an allowable traffic rate limit range; update, based on determining whether the expected traffic rate is within the allowable traffic rate limit range, the traffic rate limit; and cause traffic associated with the traffic protocol type to be policed based on the updated traffic rate limit.

BRIEF DESCRIPTION OF THE DRAWINGS

FIGS. 1A-1D are diagrams of one or more example implementations described herein. As shown in FIGS. 1A-1D, the example implementation(s) 100 may include a client device, a network device, and/or the like.

FIGS. 4-6 are flowcharts of example processes for updating a traffic rate limit for policing traffic.

DETAILED DESCRIPTION

Figure 1A:
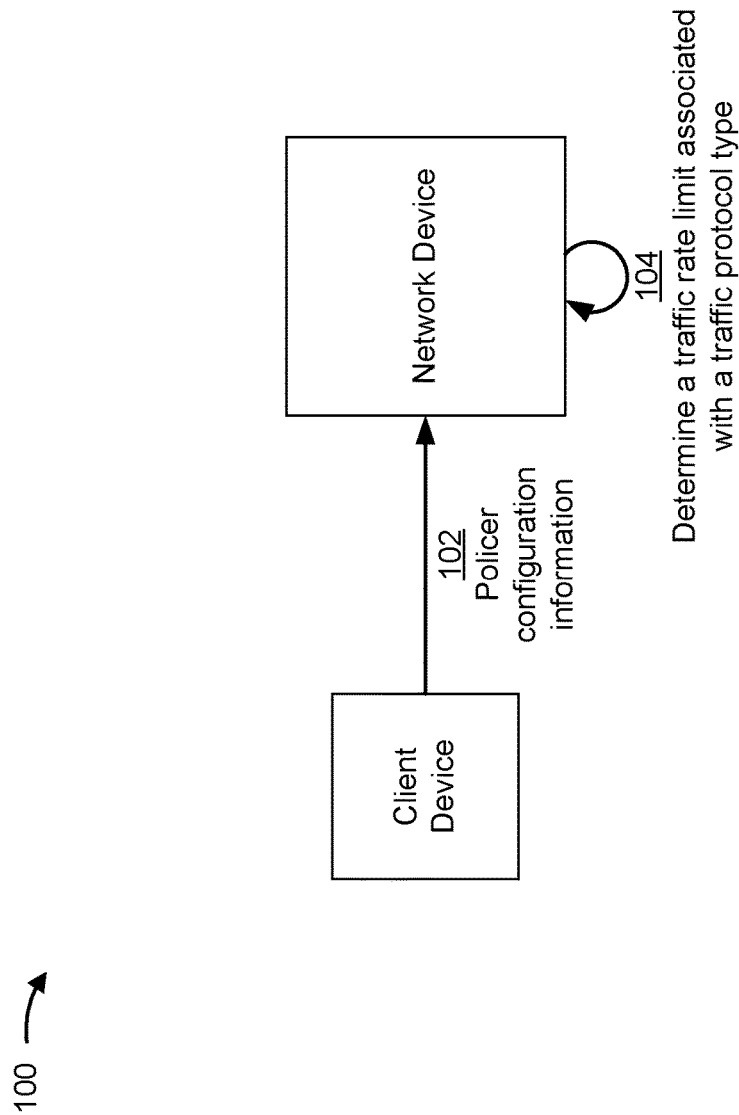

The following detailed description of example implementations refers to the accompanying drawings. The same reference numbers in different drawings may identify the same or similar elements.

A network device, such as a router, a switch, and/or the like, may use a policer to protect the network device and/or a network from Denial of Service (DoS) attacks (e.g., where a large volume of network traffic is used to overwhelm a target network by sending large quantities of packets to multiple devices in the target network) and/or Distributed Denial of Service (DDoS) attacks (e.g., where multiple sources are used to flood a single device in the target network). A policer may be configured to restrict traffic (e.g., traffic associated with a particular traffic protocol type) based on one or more configuration settings, such as a traffic rate limit (e.g., a maximum amount of packets, bytes, and/or the like allowed per a period of time), a traffic burst size (e.g., an amount of packets, bytes, and/or the like allowed at one time), and/or the like. Often, the configuration settings are static and cannot adapt to real-time flows of traffic. Consequently, in many cases, the network device that implements the policer may allow, based on the configuration settings, either too much traffic or too little traffic to be received, routed, and/or forwarded by the network device. This may cause legitimate traffic to be dropped by the network device and/or may allow illegitimate traffic (e.g., traffic associated with a DoS and/or a DDoS attack) to be received, routed, and/or forwarded by the network device.

Some implementations described herein provide a device (e.g., a network device) that is capable of dynamically updating a traffic rate limit for policing traffic associated with a traffic protocol type. In some implementations, the device may determine the traffic rate limit associated with the traffic protocol type and may obtain, based on the traffic protocol type, networking data associated with the traffic protocol type (e.g., programmed information concerning the traffic protocol type, status information concerning the traffic protocol type, and/or the like). In some implementations, the device may determine, based on the networking data, an expected traffic rate associated with the traffic protocol type and may update, based on the expected traffic rate, the traffic rate limit (e.g., set the traffic rate limit to be the expected traffic rate). Therefore, in some implementations, the device may cause traffic associated with the traffic protocol type to be policed based on the updated traffic rate limit.

In this way, the device is able to adapt the traffic rate limit based on real-time programmed information, status information, networking data, and/or the like associated with the traffic protocol type. Accordingly, the traffic rate limit is more likely to be set to a level that accommodates legitimate traffic and/or prevents an overflow of illegitimate traffic. This reduces or eliminates a need to receive, route, forward, and/or process illegitimate traffic, which conserves processing and/or memory resources of the device, and permits the device to remain operational and continue receiving, routing, forwarding and/or processing legitimate traffic. In addition, this maintains the integrity of the network associated with the device, reduces the likelihood that a target device (e.g., of a DoS/DDoS attack) of the network will become inoperable, and/or reduces or eliminates a need for a network or system administrator to intervene (such as to restart the device and/or one or more other device(s) of the network).

FIGS. 1A-1D are diagrams of one or more example implementations 100 described herein. As shown in FIGS. 1A-1D, example implementation(s) 100 may include a client device, a network device, and/or the like. The network device may include various types of devices, such as a router, a gateway, a switch, a bridge, a wireless access point, a base station, a spine, a firewall, a policer, and/or the like. The network device may be included in a network, such as a cellular network, a local area network (LAN), a core network, an access network, a wide area network (WAN) such as the Internet, a cloud network, and/or the like.

As shown in FIG. 1A and by reference number 102, the network device may obtain policer configuration information. The policer configuration information may indicate a traffic rate limit (e.g., in packets per second (pps), bytes per second (Bps), and/or the like), a traffic burst size (e.g., in packets, bytes, and/or the like), and/or the like associated with a traffic protocol type that may be used to police traffic associated with the traffic protocol type. The traffic protocol type may be an open shortest path first (OSPF) traffic protocol type, an intermediate system to intermediate system (IS-IS) traffic protocol type, a border gateway protocol (BGP) traffic protocol type, a bidirectional forwarding detection (BFD) traffic protocol type, a transmission control protocol (TCP) traffic protocol type, and/or the like. In some implementations, the policer configuration information may identify a type of the network device (e.g., a policer type).

In some implementations, the network device may obtain the policer configuration information from the client device. For example, a user may interact with a user interface of the client device to cause the client device to run a program (e.g., a mobile device application, a desktop computer application, and/or the like) that enables the user to input information (e.g., the traffic rate limit, the traffic burst size, and/or the like) into the client device that causes the client device to generate and send the policer configuration information to the network device.

As shown by reference number 104, the network device may determine the traffic rate limit associated with the traffic protocol type (e.g., based on the policer configuration information). For example, the network device may parse the policer configuration information to identify the traffic rate limit associated with the traffic protocol type.

Figure 1B:
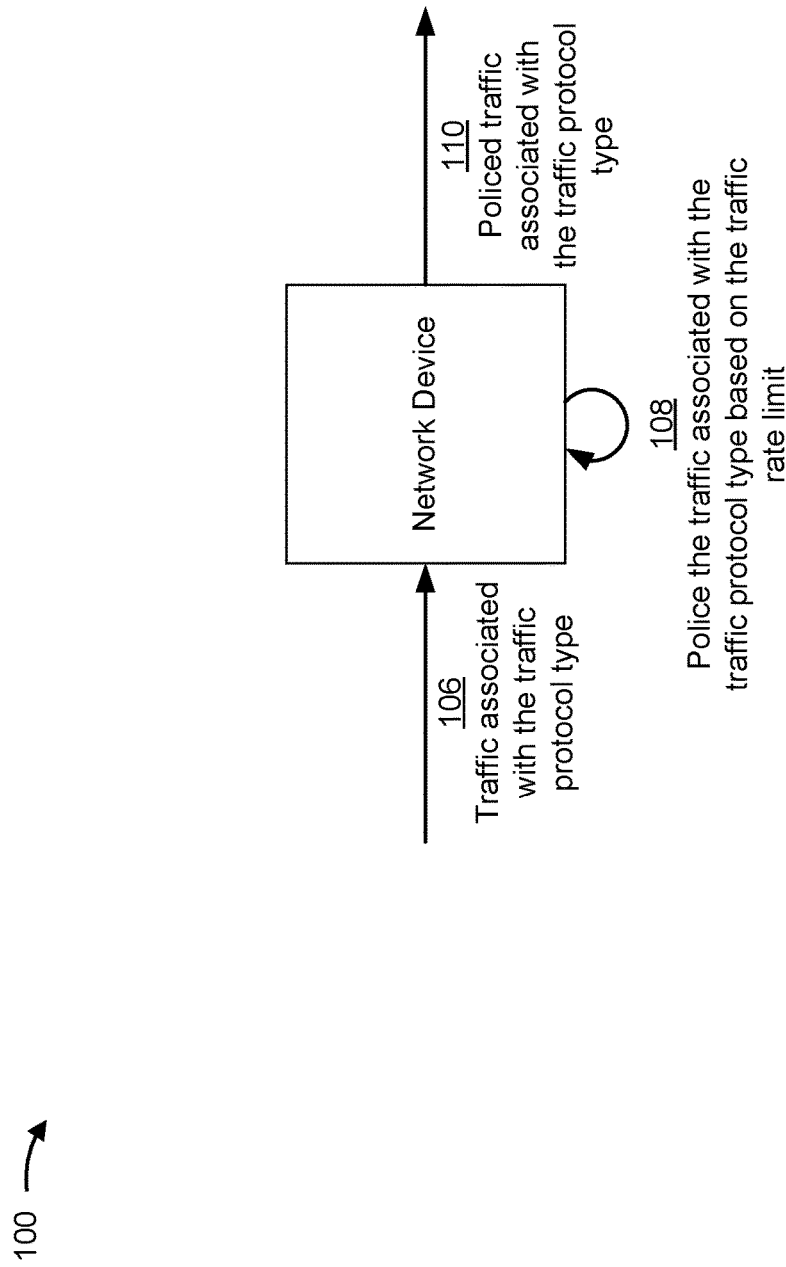

As shown in FIG. 1B and by reference number 106, the network device may receive traffic associated with the traffic protocol type. For example, the network device may receive the traffic associated with the traffic protocol device from at least one origination device (e.g., the client device or another device) and/or at least one other network device (e.g., at least one other network device included in the network). As shown by reference number 108, the network device may police, or cause to be policed, the traffic associated with the traffic protocol type (e.g., based on the traffic rate limit). For example, the network device may cause the traffic rate limit to be enforced on a forwarding plane and/or a routing plane of the network device. This may cause any traffic associated with the traffic protocol type that exceeds (e.g., is greater than) the traffic rate limit to be dropped and/or discarded. As shown by reference number 110, the network device may route and/or forward the policed traffic associated with the traffic protocol type (e.g., the traffic associated with the traffic protocol type that is within (e.g., less than or equal to) the traffic rate limit) to at least one destination device (e.g., the client device or another device) and/or at least one other network device (e.g., at least one other network device included in the network).

In some implementations, the network device may determine information related to the traffic protocol type. The information related to the traffic protocol type may indicate one or more programmed categories concerning the traffic protocol type, one or more status categories concerning the traffic protocol type, and/or the like. For example, when the traffic protocol type is a BFD traffic protocol type, the information related to the traffic protocol may indicate a category related to a number of BFD sessions, a category related to a transmission interval for transmitting keep-alive messages via a BFD session, a category related to a reception interval for receiving keep-alive messages via a BFD session, a category related to a multiplier value related to maintaining a BFD session, a category related to a number of neighboring network devices, of the network device, that support BFD sessions, and/or the like. As another example, when the traffic protocol type is a TCP traffic protocol type, the information related to the traffic protocol may indicate a category related to a number of TCP-supported sockets of the network device, a category related to a number of current TCP connections of the network, a category related to a respective state of the current TCP connections of the network, a category related to a limit on the number of TCP connections of the network, and/or the like. In another example, the information related to the traffic protocol may indicate a limit on a number of packets in a queue, such as a fragment queue (e.g., a maximum queue length of the fragment queue).

As shown in FIG. 1C and by reference number 112, the network device may obtain networking data associated with the traffic protocol type (e.g., based on the information related to the traffic protocol type). In some implementations, the network device may obtain the programmed networking data from a data structure (e.g., at least one database, such as a database associated with the traffic protocol type, a networking database, and/or the like). For example, the network device may send a query that indicates at least one of the one or more programmed categories concerning the traffic protocol type to the data structure to obtain the networking data. The data structure may be included in the network device, or may be accessible to the network device via the network, and may be configured to maintain programmed information concerning the traffic protocol type, status information concerning the traffic protocol type, and/or the like.

In some implementations, the network device may obtain one or more networking data samples (e.g., from the data structure) at one or more respective time intervals (e.g., over a period of time). A networking data sample may include programmed information concerning the traffic protocol type, status information concerning the traffic protocol type, and/or the like that corresponds to a respective time interval. In some implementations, the network device may combine the one or more respective networking data samples to create the networking data (e.g., the network device may comprise the one or more networking data samples). Accordingly, the networking data may include programmed information concerning the traffic protocol type (e.g., current settings concerning a session associated with the protocol type), status information concerning the traffic protocol type (e.g., per session), and/or the like for each time interval of the one or more time intervals that are respectively associated with the one or more networking data samples.

In some implementations, a networking data sample may include, for a corresponding time interval, information indicating a number of sessions associated with the traffic protocol type; information indicating a transmission interval for transmitting keep-alive messages via a session associated with the traffic protocol type; information indicating a reception interval for receiving keep-alive messages via a session associated with the traffic protocol type; information indicating a multiplier value related to maintaining a session associated with the traffic protocol type; information indicating a number of neighboring network devices, of the network device, associated with the traffic protocol type; information indicating a number of sockets of the network device associated with the traffic protocol type; information indicating a number of connections associated with the traffic protocol type or a number of routes associated with the traffic protocol type; information indicating a respective state (e.g. an initiation state, a maintenance state, a dormant state, a terminated state, and/or the like) of at least one connection associated with the traffic protocol type or a respective state of at least one route associated with the traffic protocol type; information indicating a limit related to a number of connections or a limit related to a number of routes associated with the traffic protocol type; information indicating a limit related to a number of packets in a queue associated with the traffic protocol type; information indicating a historical amount of traffic associated with the traffic protocol type during at least one time interval; and/or the like. Accordingly, the networking data, because the networking data comprises the one or more networking data samples, may include the same or similar information as a networking data sample for each time interval of the one or more time intervals that are respectively associated with the one or more networking data samples.

For example, when the traffic protocol type is a BFD traffic protocol type, the networking data may include information indicating a number of BFD sessions; information indicating a transmission interval for transmitting keep-alive messages via a BFD session; information indicating a reception interval for receiving keep-alive messages via a BFD session; information indicating a multiplier value related to maintaining a BFD session; information indicating a number of neighboring network devices, of the network device, that support BFD sessions; and/or the like for each time interval of the one or more time intervals. As another example, when the traffic protocol type is an OSPF traffic protocol type, the networking data may include information associated with the OSPF traffic protocol type (e.g., information programmed to be associated with the OSPF traffic protocol type), such as information indicating a number of OSPF connections; information indicating a transmission interval for transmitting OSPF keep-alive messages (e.g., "hello" messages); information indicating a reception interval for receiving OSPF keep-alive messages; information indicating a number of OSPF connections; information indicating a respective state of at least one OSPF connection; information indicating a historical amount of OSPF traffic during at least one time interval; additional information included in a data structure (e.g., a database) associated with the OSPF traffic protocol type; and/or the like for each time interval of the one or more time intervals.

As shown by reference number 114, the network device may determine one or more estimated traffic rates respectively associated with the one or more time intervals and/or the one or more networking data samples of the networking data. The network device may determine an estimated traffic rate by using a lookup table, a formula, an algorithm, and/or the like on a respective networking data sample. For example, when the traffic protocol type is a BFD traffic protocol type, a particular networking data sample may indicate, for a particular time interval, that 1,000 BFD sessions are supported by the network and that the transmission interval for transmitting keep-alive messages via a BFD session is 0.5 seconds. The network device may therefore determine, using a formula on the particular networking data (e.g., 1,000 messages divided by 0.5 seconds), that the estimated traffic rate is 2,000 pps.

In some implementations, the network device may determine an estimated traffic rate by determining an estimated periodic traffic rate (e.g., for traffic that regularly occurs) and/or an estimated non-periodic traffic rate (e.g., for traffic that does not regularly occur) for a time interval associated with a networking data sample. The network device may determine the estimated periodic traffic rate and/or the estimated non-periodic traffic rate based on the programmed information concerning the traffic protocol type, the status information concerning the traffic protocol type, and/or the like included in the networking data sample. For example, the network device may determine the estimated periodic traffic rate based on a number of sessions associated with a traffic protocol type and a transmission interval for transmitting keep-alive messages via a session associated with the traffic protocol type. As another example, the network device may determine the estimated non-periodic traffic rate based on a number of neighboring network devices, of the network device, associated with the traffic protocol type; a number of sockets of the network device associated with the traffic protocol type; a number of routes associated with the traffic protocol type; a respective state (e.g. an initiation state, a maintenance state, a dormant state, a terminated state, and/or the like) of at least one route associated with the traffic protocol type; a historical amount of traffic associated with the traffic protocol type during at least one time interval; and/or the like. The network device may determine the estimated traffic rate by combining (e.g., adding together) the estimated periodic traffic rate and the estimated non-periodic traffic rate associated with the traffic protocol type.

As shown by reference number 116, the network device may determine an expected traffic rate associated with the traffic protocol type by combining the one or more estimated traffic rates respectively associated with the one or more time intervals and/or the one or more networking data samples of the networking data. For example, the network device may use an extrapolation model (e.g., a linear extrapolation model, a polynomial extrapolation model, a conic extrapolation model, a French curve extrapolation model, and/or the like) on the one or more estimated traffic rates to determine the expected traffic rate. As another example, the network device may use a moving average model (e.g., a simple moving average model, a weighted moving average model, an exponential moving average model, and/or the like) on the one or more estimated traffic rates to determine the expected traffic rate.

Additionally, or alternatively, the network device may determine the expected traffic rate using a machine learning model. For example, the network device may process the networking data (e.g., that includes the one or more networking data samples) using the machine learning model to determine the expected traffic rate.

In some implementations, the network device may generate and/or train the machine learning model. For example, the network device may obtain (e.g., from the data structure) and process historical information (e.g., historical networking data, historical networking data samples, historical expected traffic rates, historical estimated traffic rates, and/or the like) to generate and/or train the machine learning model to determine an expected traffic rate.

In some implementations, the network device may perform a set of data manipulation procedures to pre-process the historical information to generate the machine learning model. The network device may use a data pre-processing procedure, a model training procedure, a model verification procedure, and/or the like to pre-process the historical information to generate pre-processed historical information. For example, the network device may pre-process the historical information to remove irrelevant information, confidential data, corrupt data, and/or the like. In this way, the network device may organize thousands, millions, or billions of data entries for machine learning and model generation.

In some implementations, the network device may perform a training operation when generating the machine learning model. For example, the network device may portion the historical information into a training set (e.g., a set of data used to train the model), a validation set (e.g., a set of data used to evaluate a fit of the model and/or to fine tune the model), a test set (e.g., a set of data used to evaluate a final fit of the model), and/or the like. In some implementations, a minimum feature set may be created from pre-processing and/or dimensionality reduction of the historical information. In some implementations, the network device may train the machine learning model on this minimum feature set, thereby reducing processing required to train the machine learning model, and may apply a classification technique to the minimum feature set.

When training the machine learning model, the network device may utilize a random forest classifier technique to train the machine learning model. For example, the network device may utilize a random forest classifier technique to construct multiple decision trees during training and may output a classification of the historical information. As another example, the network device may utilize a random forest regression technique to construct multiple decision trees during training and may output a numeric predication associated with the historical information. Additionally, or alternatively, when training the machine learning model, the network device may utilize one or more gradient boosting techniques to generate the machine learning model. For example, the network device may utilize an xgboost classifier technique, an xgboost regression technique, a gradient boosting machine (GBM) technique, a gradient boosting tree, and/or the like to generate a prediction model from a set of weak prediction models.

When training the machine learning model, the network device may utilize a logistic regression technique to train the machine learning model. For example, the network device may utilize a binary classification of the historical information (e.g., whether the historical information is indicative of a particular accurate prediction), a multi-class classification of the historical information (e.g., whether the historical information is indicative of one or more accurate predictions), and/or the like to train the machine learning model. Additionally, or alternatively, when training the machine learning model, the network device may utilize a naïve Bayes classifier technique to train the machine learning model. For example, the network device may utilize binary recursive partitioning to divide the historical information into various binary categories (e.g., starting with whether the historical information is indicative of a particular accurate prediction). Based on using recursive partitioning, the network device may reduce utilization of computing resources relative to manual, linear sorting and analysis of data points, thereby enabling use of thousands, millions, or billions of data points to train a machine learning model, which may result in a more accurate machine learning model than using fewer data points.

Additionally, or alternatively, when training the machine learning model, the network device may utilize a support vector machine (SVM) classifier technique. For example, the network device may utilize a linear model to implement non-linear class boundaries, such as via a max margin hyperplane. Additionally, or alternatively, when utilizing the SVM classifier technique, the network device may utilize a binary classifier to perform a multi-class classification. Use of an SVM classifier technique may reduce or eliminate overfitting, may increase a robustness of the machine learning model to noise, and/or the like.

In some implementations, the network device may train the machine learning model using a supervised training procedure. In some implementations, the network device may receive additional input to the machine learning model from other sources. In some implementations, the network device may use one or more other model training techniques, such as a neural network technique, and/or the like. For example, the network device may perform a multi-layer artificial neural network processing technique (e. g, using a recurrent neural network architecture, a two-layer feedforward neural network architecture, a three-layer feedforward neural network architecture, and/or the like) to perform pattern recognition with regard to patterns in the historical information. Use of the artificial neural network processing technique may improve an accuracy of a supervised learning model generated by the network device by being more robust to noisy, imprecise, or incomplete data, and by enabling the network device to detect patterns and/or trends undetectable to human analysts or systems using less complex techniques. Furthermore, when using a recurrent neural network architecture, long short-term memory (LSTM) may be employed to classify, make predictions, and/or otherwise process time-series data, which may be useful to predict how patterns change over time (e.g., over a month, a year, and/or the like).

In some implementations, a different device, such as a server device, may generate and/or train the machine learning model. The network device may obtain the machine learning model from the different device. For example, the different device may send the machine learning model to the network device and/or the network device may request and receive the machine learning model from the different device. In some implementations, the different device may update and send (e.g., on a scheduled basis, on an on-demand basis, on a triggered basis, and/or the like) the machine learning model to the network device. The network device may obtain the updated machine learning model from the different device.

In this way, the network device may use artificial intelligence techniques, machine learning techniques, deep learning techniques, and/or the like to determine one or more associations between historical information.

As shown by reference number 118, the network device may update the traffic rate limit (e.g., based on the expected traffic rate). For example, the network device may update the traffic rate limit to be the expected traffic rate, a percentage of the expected traffic rate (e.g., 115% of the expected traffic rate), and/or the like.

In some implementations, the network device may determine an allowable traffic rate limit range that identifies a minimum traffic rate limit and/or a maximum traffic rate limit (e.g., a lower bound and/or an upper bound of the allowable traffic rate limit range). The minimum traffic rate limit may be a first percentage of the traffic rate limit (e.g., 90% of the traffic rate limit) and the maximum traffic rate limit may be a second percentage of the traffic rate limit (e.g., 110% of the traffic rate limit). In some implementations, the network device may determine whether the expected traffic rate is within the allowable traffic rate limit range to determine how to update the traffic rate limit. For example, the network device may update the traffic rate limit to be the expected traffic rate when the expected traffic rate is within the allowable traffic rate limit range (e.g., the expected traffic rate is greater than or equal to the minimum traffic rate limit and less than or equal to the maximum traffic rate limit); may update the traffic rate limit to be the minimum traffic rate limit when the expected traffic rate is less than the minimum traffic rate limit; or may update the traffic rate limit to be the maximum traffic rate limit when the expected traffic rate is greater than the maximum traffic rate limit. In this way, the network device ensures that the traffic rate limit is gradually increased or decreased over time, which may prevent momentary changes associated with the traffic protocol type (e.g., flapping of sessions, connections, routes, and/or the like) from drastically affecting the traffic rate limit.

Additionally, or alternatively, the network device may determine a minimum traffic rate deviation range that identifies a minimum traffic rate deviation limit and/or a maximum traffic rate deviation limit (e.g., a lower bound and/or an upper bound of the minimum traffic rate deviation range). The minimum traffic rate deviation limit may be a first percentage of the traffic rate limit (e.g., 98% of the traffic rate limit) and the maximum traffic rate deviation limit may be a second percentage of the traffic rate limit (e.g., 102% of the traffic rate limit). In some implementations, the network device may determine whether the expected traffic rate is outside (e.g., not within) the minimum traffic rate deviation range to determine how to update the traffic rate limit. For example, the network device may not update the traffic rate limit when the expected traffic rate is within the minimum traffic rate deviation range (e.g., the expected traffic rate is greater than or equal to the minimum traffic rate deviation limit and less than or equal to the maximum traffic rate deviation limit); may update the traffic rate limit to be the expected traffic rate when the expected traffic rate is less than the minimum traffic rate deviation limit; or may update the traffic rate limit to be the expected traffic rate when the expected traffic rate is greater than the maximum traffic rate limit. In this way, the network device conserves resources (e.g., processing resources, memory resources, networking resources, power resources, and/or the like) of the network device by only updating the traffic rate limit when the expected traffic rate is significantly different than the traffic rate limit.

Figure 1D:
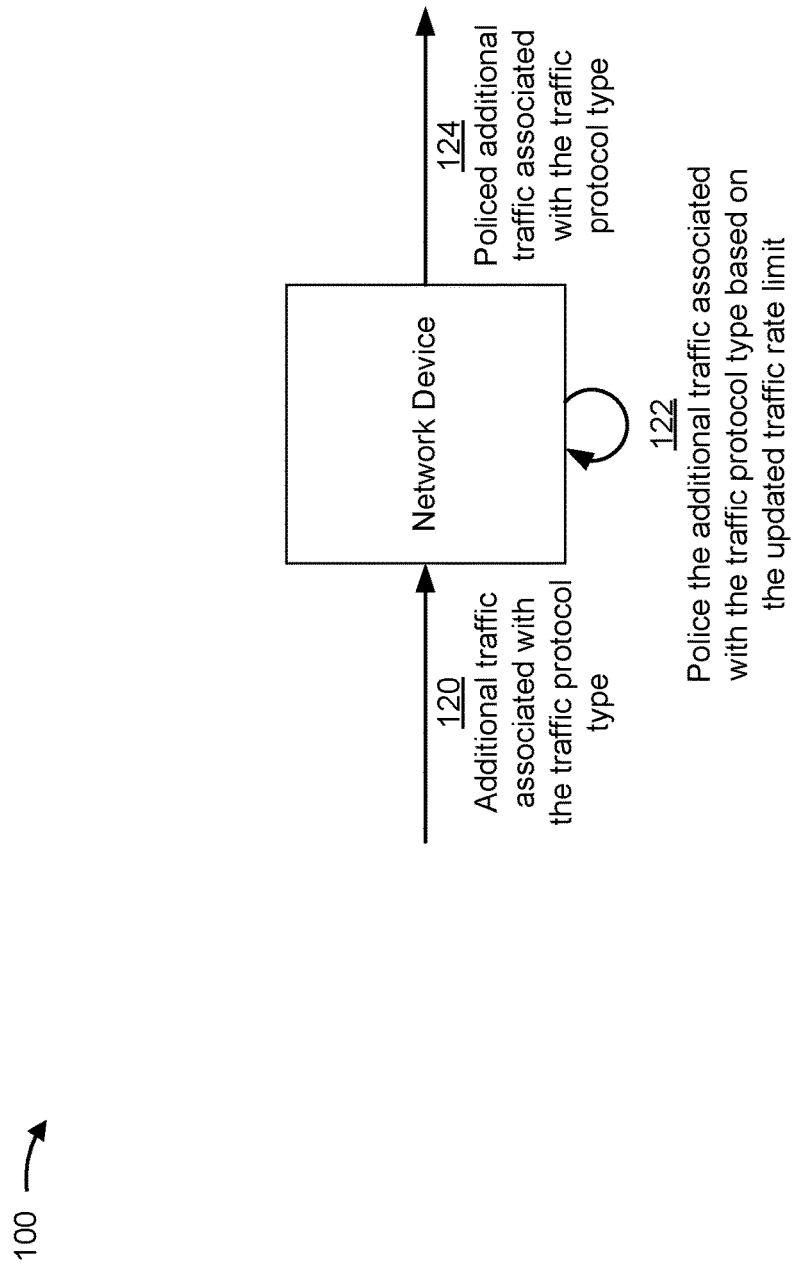

As shown in FIG. 1D and by reference number 120, the network device may receive additional traffic associated with the traffic protocol type. For example, the network device may receive the additional traffic associated with the traffic protocol device from at least one origination device (e.g., the client device or another device) and/or at least one other network device (e.g., at least one other network device included in the network). As shown by reference number 122, the network device may police, or cause to be policed, the additional traffic associated with the traffic protocol type (e.g., based on the updated traffic rate limit). For example, the network device may cause the updated traffic rate limit to be enforced on a forwarding plane and/or a routing plane of the network device. This may cause any additional traffic associated with the traffic protocol type that exceeds (e.g., is greater than) the traffic rate limit to be dropped and/or discarded. As shown by reference number 124, the network device may receive, route, and/or forward the policed additional traffic associated with the traffic protocol type (e.g., the additional traffic associated with the traffic protocol type that is within (e.g., less than or equal to) the updated traffic rate limit) to at least one destination device (e.g., the client device or another device) and/or at least one other network device (e.g., at least one other network device included in the network).

As indicated above, FIGS. 1A-1D are provided merely as one or more examples. Other examples may differ from what is described with regard to FIGS. 1A-1D.

Figure 2:
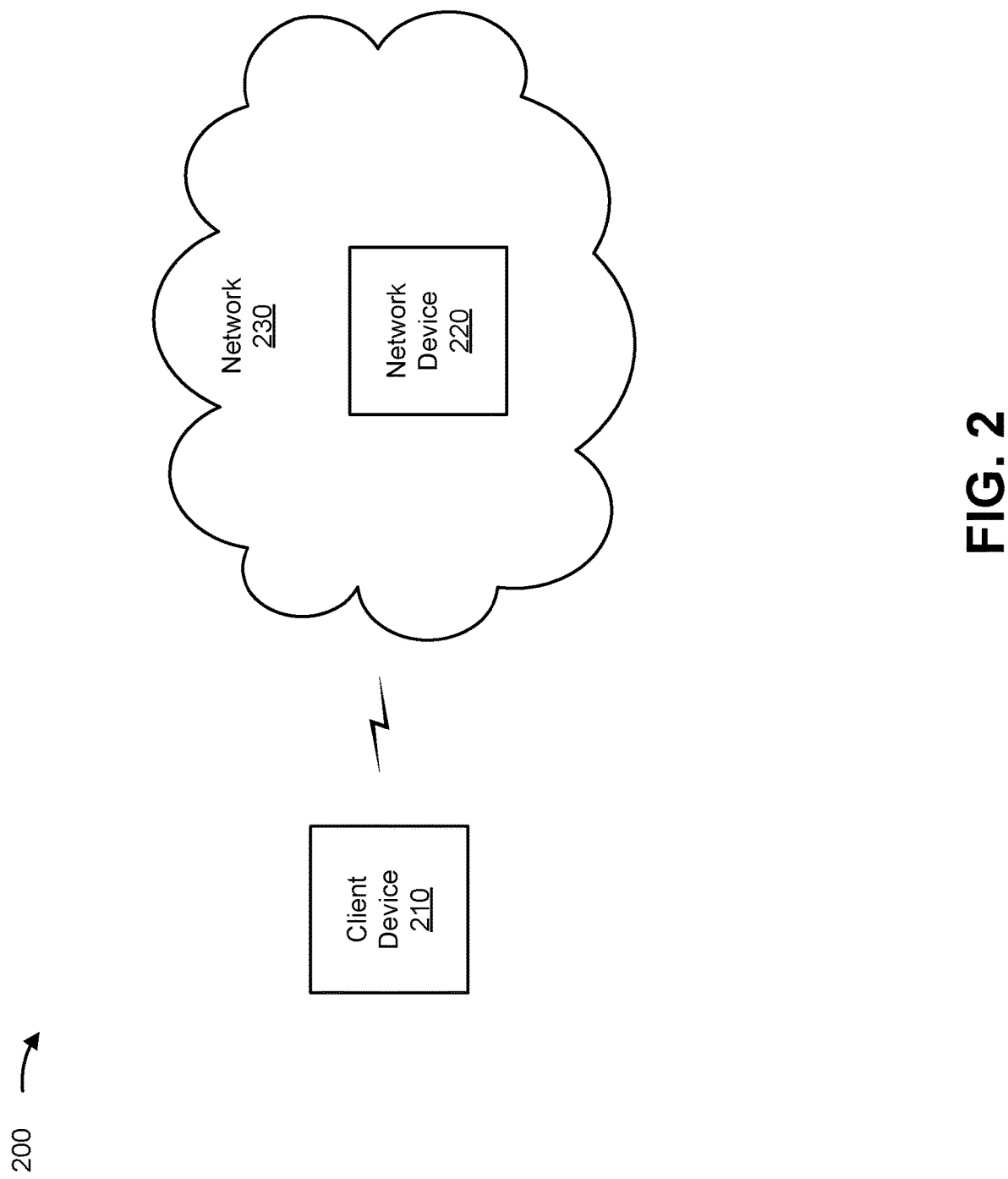
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 210, network device 220, and network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a computer (e.g., a desktop computer, a laptop computer, a tablet computer, a handheld computer, a server device, and/or the like), a mobile phone (e.g., a smart phone, a radiotelephone, and/or the like), or a similar device. In some implementations, client device 210 may communicate with network device 220 via network 230.

Network device 220 includes one or more devices capable of receiving, storing, generating, processing, forwarding, and/or transferring information in a manner described herein. For example, network device 220 may include a router, a switch, a gateway, a firewall device, a modem, a hub, a bridge, a policer, a network interface controller (NIC), a reverse proxy, a server (e.g., a proxy server), a multiplexer, a security device, an intrusion detection device, a load balancer, or a similar device. In some implementations, network device 220 may be a physical device implemented within a housing, such as a chassis. In some implementations, network device 220 may be a virtual device implemented by one or more computer devices of a cloud computing environment or a data center. In some implementations, network device 220 may include and/or communicate with one or more data structures and may communicate with client device 210 via network 230.

Network 230 includes one or more wired and/or wireless networks. For example, network 250 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
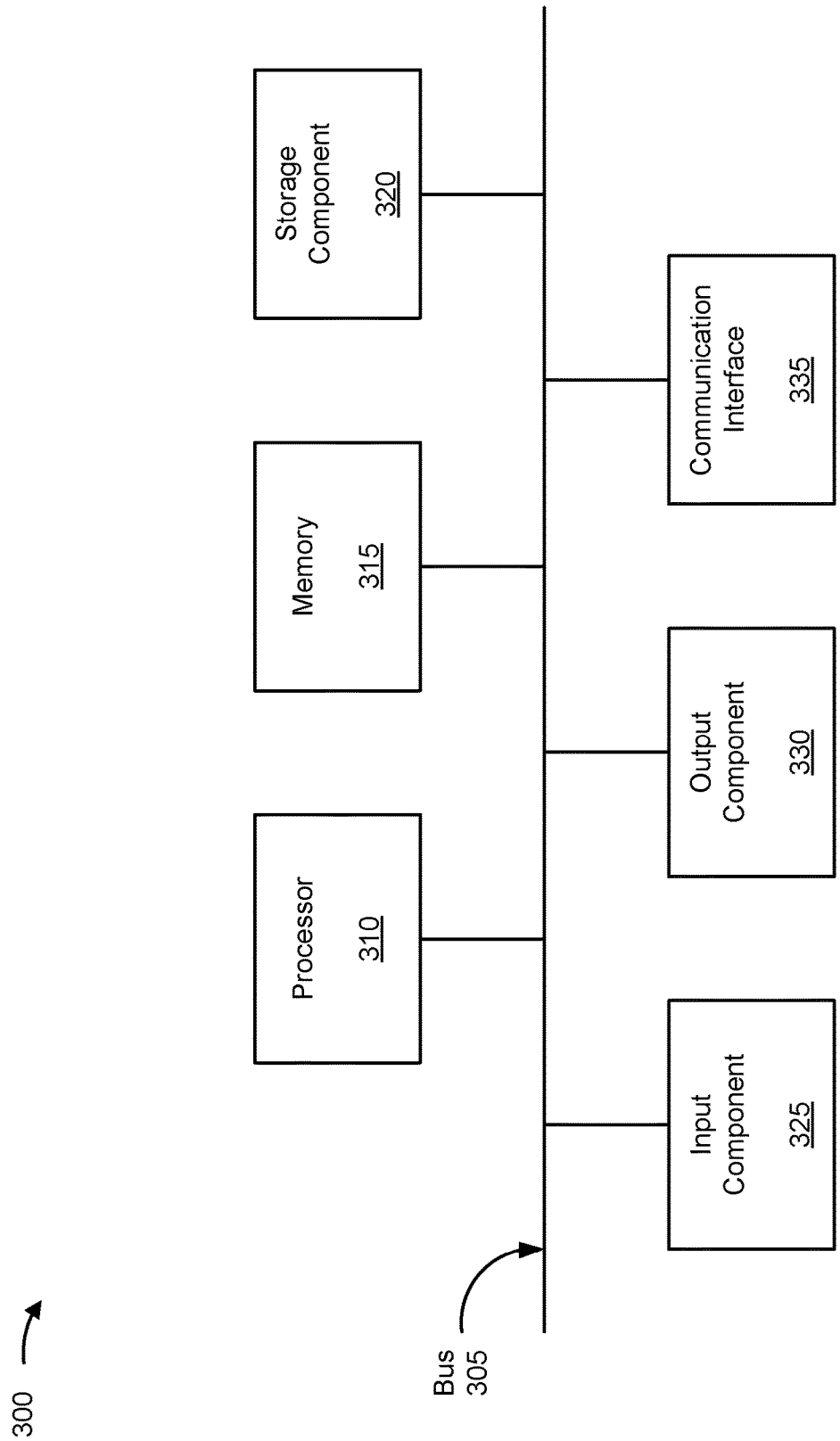
FIGS. 3A and 3B are diagrams of example components of one or more devices of FIG. 2.
Figure 3B:
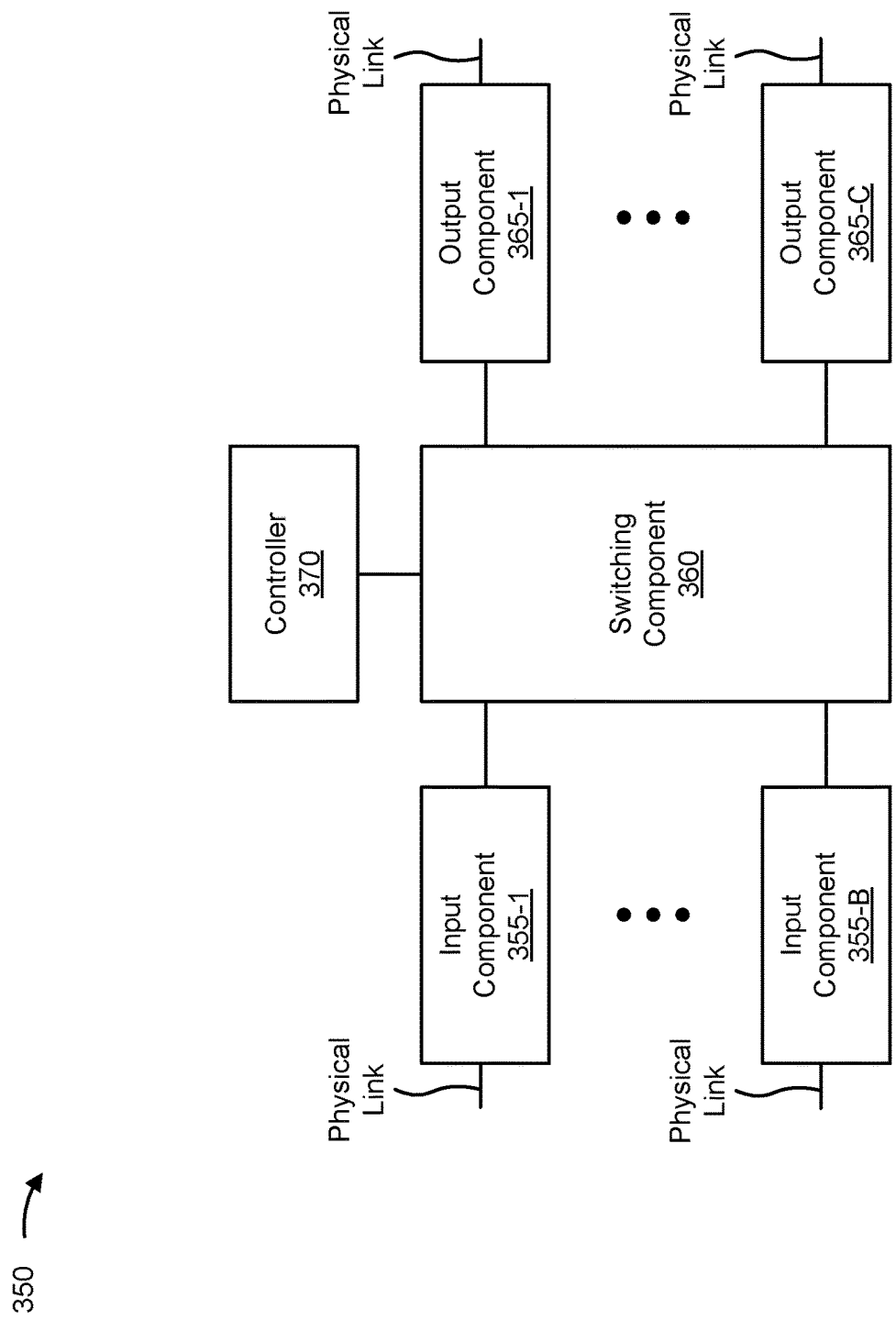

FIGS. 3A-3B are diagrams of example components of one or more devices of FIG. 2. FIG. 3A is a diagram of example components of a device 300. Device 300 may correspond to client device 210, network device 220, and/or the like. In some implementations, client device 210, network device 220, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to client device 210, network device 220, and/or the like. In some implementations, client device 210, network device 220, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
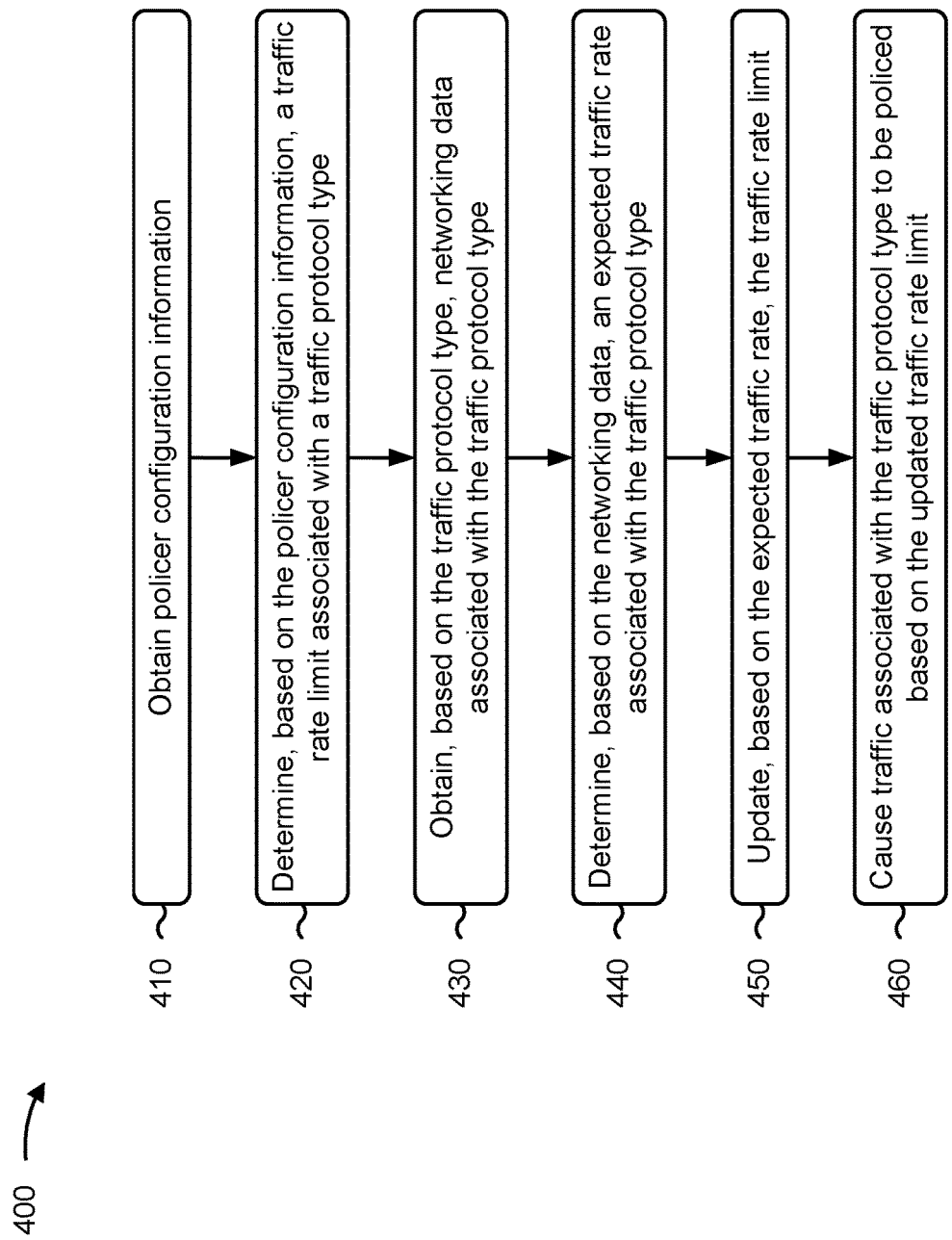

FIG. 4 is a flow chart of an example process 400 for updating a traffic rate limit for policing traffic. In some implementations, one or more process blocks of FIG. 4 may be performed by a network device (e.g., network device 220). In some implementations, one or more process blocks of FIG. 4 may be performed by another device or a group of devices separate from or including the network device, such as another network device, a client device (e.g., client device 210), and/or the like.

As shown in FIG. 4, process 400 may include obtaining policer configuration information (block 410). For example, the network device (e.g., using processor 310, memory 315, storage component 320, input component 325, output component 330, communication interface 335, input component 355, switching component 360, output component 365, controller 370, and/or the like) may obtain policer configuration information, as described above.

As further shown in FIG. 4, process 400 may include determining, based on the policer configuration information, a traffic rate limit associated with a traffic protocol type (block 420). For example, the network device (e.g., using processor 310, memory 315, storage component 320, input component 325, output component 330, communication interface 335, input component 355, switching component 360, output component 365, controller 370, and/or the like) may determine, based on the policer configuration information, a traffic rate limit associated with a traffic protocol type, as described above.

As further shown in FIG. 4, process 400 may include obtaining, based on the traffic protocol type, networking data associated with the traffic protocol type (block 430). For example, the network device (e.g., using processor 310, memory 315, storage component 320, input component 325, output component 330, communication interface 335, input component 355, switching component 360, output component 365, controller 370, and/or the like) may obtain, based on the traffic protocol type, networking data associated with the traffic protocol type, as described above.

As further shown in FIG. 4, process 400 may include determining, based on the networking data, an expected traffic rate associated with the traffic protocol type (block 440). For example, the network device (e.g., using processor 310, memory 315, storage component 320, input component 325, output component 330, communication interface 335, input component 355, switching component 360, output component 365, controller 370, and/or the like) may determine, based on the networking data, an expected traffic rate associated with the traffic protocol type, as described above.

As further shown in FIG. 4, process 400 may include updating, based on the expected traffic rate, the traffic rate limit (block 450). For example, the network device (e.g., using processor 310, memory 315, storage component 320, input component 325, output component 330, communication interface 335, input component 355, switching component 360, output component 365, controller 370, and/or the like) may update, based on the expected traffic rate, the traffic rate limit, as described above.

As further shown in FIG. 4, process 400 may include causing traffic associated with the traffic protocol type to be policed based on the updated traffic rate limit (block 460). For example, the network device (e.g., using processor 310, memory 315, storage component 320, input component 325, output component 330, communication interface 335, input component 355, switching component 360, output component 365, controller 370, and/or the like) may cause traffic associated with the traffic protocol type to be policed based on the updated traffic rate limit, as described above.

Process 400 may include additional implementations, such as any single implementation or any combination of implementations described below and/or in connection with one or more other processes described elsewhere herein.

In a first implementation, the networking data is obtained from a data structure configured to maintain programmed information concerning the traffic protocol type or status information concerning the traffic protocol type.

In a second implementation, alone or in combination with the first implementation, determining the expected traffic rate associated with the traffic protocol type comprises determining, based on the networking data, one or more estimated traffic rates and determining, based on the one or more estimated traffic rates, the expected traffic rate.

In a third implementation, alone or in combination with one or more of the first and second implementations, updating the traffic rate limit comprises determining an allowable traffic rate limit range, determining that the expected traffic rate is within the allowable traffic rate limit range, and updating the traffic rate limit to be the expected traffic rate.

In a fourth implementation, alone or in combination with one or more of the first through third implementations, updating the traffic rate limit comprises determining a minimum traffic rate deviation range, determining that the expected traffic rate is not within the minimum traffic rate deviation range, and updating the traffic rate limit to be the expected traffic rate.

In a fifth implementation, alone or in combination with one or more of the first through fourth implementations, the networking data associated with the traffic protocol type includes information indicating a number of sessions associated with the traffic protocol type; information indicating a transmission interval for transmitting keep-alive messages via a session associated with the traffic protocol type; information indicating a reception interval for receiving keep-alive messages via a session associated with the traffic protocol type; information indicating a multiplier value related to maintaining a session associated with the traffic protocol type; information indicating a number of neighboring network devices, of the network device, associated with the traffic protocol type; information indicating a number of sockets of the network device associated with the traffic protocol type; information indicating a number of connections associated with the traffic protocol type or a number of routes associated with the traffic protocol type; information indicating a respective state of at least one connection associated with the traffic protocol type or a respective state of at least one route associated with the traffic protocol type; information indicating a limit related to a number of connections or a limit related to a number of routes associated with the traffic protocol type; information indicating a limit related to a number of packets in a queue associated with the traffic protocol type; and/or the like.

In a sixth implementation, alone or in combination with one or more of the first through fifth implementations, obtaining the networking data comprises obtaining, at one or more time intervals and from a data structure, one or more respective networking data samples, and combining the one or more respective networking data samples to create the networking data.

In a seventh implementation, alone or in combination with one or more of the first through sixth implementations, determining the expected traffic rate comprises identifying one or more time intervals associated with the networking data; identifying one or more networking data samples, included in the networking data, that are respectively associated with the one or more time intervals; determining one or more estimated traffic rates respectively associated with the one or more networking data samples; and determining, using an extrapolation model and based on the one or more estimated traffic rates and the one or more time intervals, the expected traffic rate.

In an eighth implementation, alone or in combination with one or more of the first through seventh implementations, causing the traffic associated with the traffic protocol type to be policed based on the updated traffic rate limit comprises causing the updated traffic rate limit to be enforced on a forwarding plane or a routing plane of the network device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for updating a traffic rate limit for policing traffic. In some implementations, one or more process blocks of FIG. 5 may be performed by another device or a group of devices separate from or including the network device, such as another network device, a client device (e.g., client device 210), and/or the like.

As shown in FIG. 5, process 500 may include determining a traffic rate limit related to policing traffic associated with a traffic protocol type (block 510). For example, the network device (e.g., using processor 310, memory 315, storage component 320, input component 325, output component 330, communication interface 335, input component 355, switching component 360, output component 365, controller 370, and/or the like) may determine a traffic rate limit related to policing traffic associated with a traffic protocol type, as described above.

As further shown in FIG. 5, process 500 may include determining information related to the traffic protocol type (block 520). For example, the network device (e.g., using processor 310, memory 315, storage component 320, input component 325, output component 330, communication interface 335, input component 355, switching component 360, output component 365, controller 370, and/or the like) may determine information related to the traffic protocol type, as described above.

As further shown in FIG. 5, process 500 may include obtaining, based on the information related to the traffic protocol type, networking data associated with the traffic protocol type (block 530). For example, the network device (e.g., using processor 310, memory 315, storage component 320, input component 325, output component 330, communication interface 335, input component 355, switching component 360, output component 365, controller 370, and/or the like) may obtain, based on the information related to the traffic protocol type, networking data associated with the traffic protocol type, as described above.

As further shown in FIG. 5, process 500 may include determining, based on the networking data, an expected traffic rate associated with the traffic protocol type (block 540). For example, the network device (e.g., using processor 310, memory 315, storage component 320, input component 325, output component 330, communication interface 335, input component 355, switching component 360, output component 365, controller 370, and/or the like) may determine, based on the networking data, an expected traffic rate associated with the traffic protocol type, as described above.

As further shown in FIG. 5, process 500 may include updating, based on the expected traffic rate, the traffic rate limit (block 550). For example, the network device (e.g., using processor 310, memory 315, storage component 320, input component 325, output component 330, communication interface 335, input component 355, switching component 360, output component 365, controller 370, and/or the like) may update, based on the expected traffic rate, the traffic rate limit, as described above.

As further shown in FIG. 5, process 500 may include causing traffic associated with the traffic protocol type to be policed based on the updated traffic rate limit (block 560). For example, the network device (e.g., using processor 310, memory 315, storage component 320, input component 325, output component 330, communication interface 335, input component 355, switching component 360, output component 365, controller 370, and/or the like) may cause traffic associated with the traffic protocol type to be policed based on the updated traffic rate limit, as described above.

Process 500 may include additional implementations, such as any single implementation or any combination of implementations described below and/or in connection with one or more other processes described elsewhere herein.

In a first implementation, the information related to the traffic protocol type indicates one or more programmed categories concerning the traffic protocol type.

In a second implementation, alone or in combination with the first implementation, updating the traffic rate limit includes determining an allowable traffic rate limit range, wherein the allowable traffic is rating limit range identifies a minimum traffic rate limit; determining that the expected traffic rate is less than the minimum traffic rate limit; and updating the traffic rate limit to be the minimum traffic rate limit.

In a third implementation, alone or in combination with one or more of the first and second implementations, updating the traffic rate limit includes determining an allowable traffic rate limit range, wherein the allowable traffic is rating limit range identifies a maximum traffic rate limit; determining that the expected traffic rate is greater than the maximum traffic rate limit; and updating the traffic rate limit to be the maximum traffic rate limit.

In a fourth implementation, alone or in combination with one or more of the first through third implementations, determining the expected traffic rate includes identifying one or more networking data samples included in the networking data; determining one or more estimated traffic rates respectively associated with the one or more networking data samples; and determining, using a moving average technique and based on the one or more estimated traffic rates, the expected traffic rate.

In a fifth implementation, alone or in combination with one or more of the first through fourth implementations, determining the expected traffic rate includes determining, using a machine learning model and based on the networking data, the expected traffic rate.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for updating a traffic rate limit for policing traffic. In some implementations, one or more process blocks of FIG. 6 may be performed by another device or a group of devices separate from or including the network device, such as another network device, a client device (e.g., client device 210), and/or the like.

As shown in FIG. 6, process 600 may include determining a traffic rate limit related to policing traffic associated with a traffic protocol type (block 610). For example, the network device (e.g., using processor 310, memory 315, storage component 320, input component 325, output component 330, communication interface 335, input component 355, switching component 360, output component 365, controller 370, and/or the like) may determine a traffic rate limit related to policing traffic associated with a traffic protocol type, as described above.

As further shown in FIG. 6, process 600 may include obtaining, based on the traffic protocol type, one or more networking data samples associated with the traffic protocol type (block 620). For example, the network device (e.g., using processor 310, memory 315, storage component 320, input component 325, output component 330, communication interface 335, input component 355, switching component 360, output component 365, controller 370, and/or the like) may obtain, based on the traffic protocol type, one or more networking data samples associated with the traffic protocol type, as described above.

As further shown in FIG. 6, process 600 may include determining, based on the one or more networking data samples, an expected traffic rate associated with the traffic protocol type (block 630). For example, the network device (e.g., using processor 310, memory 315, storage component 320, input component 325, output component 330, communication interface 335, input component 355, switching component 360, output component 365, controller 370, and/or the like) may determine, based on the one or more networking data samples, an expected traffic rate associated with the traffic protocol type, as described above.

As further shown in FIG. 6, process 600 may include determining whether the expected traffic rate is within an allowable traffic rate limit range (block 640). For example, the network device (e.g., using processor 310, memory 315, storage component 320, input component 325, output component 330, communication interface 335, input component 355, switching component 360, output component 365, controller 370, and/or the like) may determine whether the expected traffic rate is within an allowable traffic rate limit range, as described above.

As further shown in FIG. 6, process 600 may include updating, based on determining whether the expected traffic rate is within the allowable traffic rate limit range, the traffic rate limit (block 650). For example, the network device (e.g., using processor 310, memory 315, storage component 320, input component 325, output component 330, communication interface 335, input component 355, switching component 360, output component 365, controller 370, and/or the like) may update, based on determining whether the expected traffic rate is within the allowable traffic rate limit range, the traffic rate limit, as described above.

As further shown in FIG. 6, process 600 may include causing traffic associated with the traffic protocol type to be policed based on the updated traffic rate limit (block 660). For example, the network device (e.g., using processor 310, memory 315, storage component 320, input component 325, output component 330, communication interface 335, input component 355, switching component 360, output component 365, controller 370, and/or the like) may cause traffic associated with the traffic protocol type to be policed based on the updated traffic rate limit, as described above.

Process 600 may include additional implementations, such as any single implementation or any combination of implementations described below and/or in connection with one or more other processes described elsewhere herein.

In a first implementation, determining the expected traffic rate includes determining, for each networking data sample of the one or more networking data samples, an estimated periodic traffic rate associated with the networking data sample, an estimated non-periodic traffic rate associated with the networking data sample, and an estimated traffic rate associated with the networking data sample based on the estimated periodic traffic rate associated with the networking data sample and the estimated non-periodic traffic rate associated with the networking data sample; and determining the expected traffic rate based on the estimated traffic rate respectively associated with each networking data sample of the one or more networking data samples.

In a second implementation, alone or in combination with the first implementation, determining the expected traffic rate includes determining one or more estimated traffic rates respectively associated with the one or more networking data samples and determining, using a moving average model or an extrapolation model and based on the one or more estimated traffic rates, the expected traffic rate.

In a third implementation, alone or in combination with one or more of the first and second implementations, the allowable traffic rate limit range identifies a minimum traffic rate limit and a maximum traffic rate limit and determining whether the expected traffic rate is within the allowable traffic rate limit range includes determining whether the expected traffic rate is greater than or equal to the minimum traffic rate limit and less than or equal to the maximum traffic rate limit.

In a fourth implementation, alone or in combination with one or more of the first through third implementations, the allowable traffic rate limit range identifies a minimum traffic rate limit and a maximum traffic rate limit, and updating the traffic rate limit includes updating the traffic rate limit to be the expected traffic rate when the expected traffic rate is within the allowable traffic rate limit range; updating the traffic rate limit to be the minimum traffic rate limit when the expected traffic rate is less than the minimum traffic rate limit; or updating the traffic rate limit to be the maximum traffic rate limit when the expected traffic rate is greater than the maximum traffic rate limit.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the terms traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method, comprising:
   obtaining, by a network device, policer configuration information;

determining, by the network device and based on the policer configuration information, a traffic rate limit associated with a traffic protocol type;

obtaining, by the network device and based on the traffic protocol type, networking data associated with the traffic protocol type,
wherein one or more networking data samples are included in the networking data;

determining, by the network device and based on the networking data, an expected traffic rate associated with the traffic protocol type,
wherein determining the expected traffic rate comprises:
determining one or more estimated traffic rates respectively associated with the one or more networking data samples, and
determining, based on the one or more estimated traffic rates, the expected traffic rate;

updating, by the network device and based on the expected traffic rate, the traffic rate limit; and causing, by the network device, traffic associated with the traffic protocol type to be policed based on the updated traffic rate limit.

2. The method of claim 1, wherein the networking data is obtained from a data structure configured to maintain programmed information concerning the traffic protocol type or status information concerning the traffic protocol type.

3. The method of claim 1, wherein determining the expected traffic rate associated with the traffic protocol type comprises:
determining, based on the networking data, one or more estimated traffic rates; and
determining, based on the one or more estimated traffic rates, the expected traffic rate.

4. The method of claim 1, wherein updating the traffic rate limit comprises:
determining an allowable traffic rate limit range;
determining that the expected traffic rate is within the allowable traffic rate limit range; and
updating the traffic rate limit to be the expected traffic rate.

5. The method of claim 1, wherein updating the traffic rate limit comprises:
determining a minimum traffic rate deviation range;
determining that the expected traffic rate is not within the minimum traffic rate deviation range; and
updating the traffic rate limit to be the expected traffic rate.

6. The method of claim 1, wherein the networking data associated with the traffic protocol type includes at least one of:
information indicating a number of sessions associated with the traffic protocol type;
information indicating a transmission interval for transmitting keep-alive messages via a session associated with the traffic protocol type;
information indicating a reception interval for receiving keep-alive messages via a session associated with the traffic protocol type;
information indicating a multiplier value related to maintaining a session associated with the traffic protocol type;
information indicating a number of neighboring network devices, of the network device, associated with the traffic protocol type;
information indicating a number of sockets of the network device associated with the traffic protocol type;
information indicating a number of connections associated with the traffic protocol type or a number of routes associated with the traffic protocol type;
information indicating a respective state of at least one connection associated with the traffic protocol type or a respective state of at least one route associated with the traffic protocol type;
information indicating a limit related to a number of connections or a limit related to a number of routes associated with the traffic protocol type; or
information indicating a limit related to a number of packets in a queue associated with the traffic protocol type.

7. The method of claim 1, wherein obtaining the networking data comprises:
obtaining, at one or more time intervals and from a data structure, the one or more networking data samples; and
combining the one or more networking data samples to create the networking data.

8. The method of claim 1, wherein determining the expected traffic rate comprises:
identifying one or more time intervals associated with the one or more networking data samples; and
determining, using an extrapolation model and based on the one or more estimated traffic rates and the one or more time intervals, the expected traffic rate.

9. The method of claim 1, wherein causing the traffic associated with the traffic protocol type to be policed based on the updated traffic rate limit comprises:
causing the updated traffic rate limit to be enforced on a forwarding plane or a routing plane of the network device.

10. A network device, comprising:
one or more memories; and
one or more processors to:
determine a traffic rate limit related to policing traffic associated with a traffic protocol type;
determine information related to the traffic protocol type;
obtain, based on the information related to the traffic protocol type, networking data associated with the traffic protocol type,
wherein one or more networking data samples are included in the networking data;
determine, based on the networking data, an expected traffic rate associated with the traffic protocol type,
wherein the one or more processors, when determining the expected traffic rate, are to:
determine one or more estimated traffic rates respectively associated with the one or more networking data samples, and
determine, based on the one or more estimated traffic rates, the expected traffic rate;
update, based on the expected traffic rate, the traffic rate limit; and
cause traffic associated with the traffic protocol type to be policed based on the updated traffic rate limit.

11. The network device of claim 10, wherein the information related to the traffic protocol type indicates one or more programmed categories concerning the traffic protocol type.

12. The network device of claim 10, wherein the one or more processors, when updating the traffic rate limit, are to:
determine an allowable traffic rate limit range,
wherein the allowable traffic rate limit range identifies a minimum traffic rate limit;

determine that the expected traffic rate is less than the minimum traffic rate limit; and
update the traffic rate limit to be the minimum traffic rate limit.

13. The network device of claim 10, wherein the one or more processors, when updating the traffic rate limit, are to:
determine an allowable traffic rate limit range,
wherein the allowable traffic rate limit range identifies a maximum traffic rate limit;
determine that the expected traffic rate is greater than the maximum traffic rate limit; and
update the traffic rate limit to be the maximum traffic rate limit.

14. The network device of claim 10, wherein the one or more processors, when obtaining the networking data, are to:
obtain, at one or more time intervals and from a data structure, the one or more networking data samples; and
combine the one or more networking data samples to create the networking data.

15. The network device of claim 10, wherein the one or more processors, when determining the expected traffic rate, are to:
determine, using a machine learning model and based on the networking data, the expected traffic rate.

16. A non-transitory computer-readable medium storing instructions, the instructions comprising:
one or more instructions that, when executed by one or more processors of a network device, cause the one or more processors to:
determine a traffic rate limit related to policing traffic associated with a traffic protocol type;
obtain, based on the traffic protocol type, one or more networking data samples associated with the traffic protocol type;
determine, based on the one or more networking data samples, an expected traffic rate associated with the traffic protocol type,
wherein the one or more instructions, that cause the one or more processors to determine the expected traffic rate, cause the one or more processors to:
determine one or more estimated traffic rates respectively associated with the one or more networking data samples, and
determine, based on the one or more estimated traffic rates, the expected traffic rate;
determine whether the expected traffic rate is within an allowable traffic rate limit range;
update, based on determining whether the expected traffic rate is within the allowable traffic rate limit range, the traffic rate limit; and
cause traffic associated with the traffic protocol type to be policed based on the updated traffic rate limit.

17. The non-transitory computer-readable medium of claim 16, wherein the one or more instructions, that cause the one or more processors to determine the expected traffic rate, cause the one or more processors to:
determine, for each networking data sample of the one or more networking data samples:
an estimated periodic traffic rate associated with the networking data sample,
an estimated non-periodic traffic rate associated with the networking data sample, and
an estimated traffic rate associated with the networking data sample based on the estimated periodic traffic rate associated with the networking data sample and the estimated non-periodic traffic rate associated with the networking data sample; and
determine the expected traffic rate based on the estimated traffic rate respectively associated with each networking data sample of the one or more networking data samples.

18. The non-transitory computer-readable medium of claim 16, wherein the one or more instructions, that cause the one or more processors to determine the expected traffic rate, cause the one or more processors to:
determine the expected traffic rate using a moving average model or an extrapolation model.

19. The non-transitory computer-readable medium of claim 16, wherein the allowable traffic rate limit range identifies a minimum traffic rate limit and a maximum traffic rate limit,
wherein the one or more instructions, that cause the one or more processors to determine whether the expected traffic rate is within the allowable traffic rate limit range, cause the one or more processors to:
determine whether the expected traffic rate is greater than or equal to the minimum traffic rate limit and less than or equal to the maximum traffic rate limit.

20. The non-transitory computer-readable medium of claim 16, wherein the allowable traffic rate limit range identifies a minimum traffic rate limit and a maximum traffic rate limit,
wherein the one or more instructions, that cause the one or more processors to update the traffic rate limit, cause the one or more processors to:
update the traffic rate limit to be the expected traffic rate when the expected traffic rate is within the allowable traffic rate limit range;
update the traffic rate limit to be the minimum traffic rate limit when the expected traffic rate is less than the minimum traffic rate limit; or
update the traffic rate limit to be the maximum traffic rate limit when the expected traffic rate is greater than the maximum traffic rate limit.

* * * * *